US012592386B2

(12) United States Patent (10) Patent No.: US 12,592,386 B2
Watanabe et al. (45) Date of Patent: Mar. 31, 2026

(54) METHOD FOR PRODUCING COMPOSITE PARTICLE, POSITIVE ELECTRODE, AND ALL-SOLID-STATE BATTERY, AND COMPOSITE PARTICLE, POSITIVE ELECTRODE, AND ALL-SOLID-STATE BATTERY

(71) Applicant: TOYOTA JIDOSHA KABUSHIKI KAISHA, Toyota (JP)

(72) Inventors: Hideaki Watanabe, Nisshin (JP); Masaru Kubota, Okazaki (JP); Ryosuke Furuya, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 537 days.

(21) Appl. No.: 18/104,631

(22) Filed: Feb. 1, 2023

(65) Prior Publication Data

US 2023/0343961 A1 Oct. 26, 2023

(30) Foreign Application Priority Data

Apr. 26, 2022 (JP) ................................. 2022-072096

(51) Int. Cl.
*H01M 4/62* (2006.01)
*H01M 4/02* (2006.01)
*H01M 4/04* (2006.01)
*H01M 10/0562* (2010.01)
(52) U.S. Cl.
CPC ........... *H01M 4/62* (2013.01); *H01M 4/0404* (2013.01); *H01M 4/0435* (2013.01); *H01M 10/0562* (2013.01); *H01M 2004/021* (2013.01); *H01M 2004/028* (2013.01); *H01M 2300/0068* (2013.01)

(58) Field of Classification Search
CPC .... H01M 4/0404; H01M 4/0435; H01M 4/62; H01M 10/0562
See application file for complete search history.

(56) References Cited

U.S. PATENT DOCUMENTS

| 2014/0154563 A1* | 6/2014 | Oguro ..................... H01M 4/62 |
| | | 429/211 |
| 2018/0219229 A1* | 8/2018 | Miki ................. H01M 10/0525 |
| 2019/0181432 A1* | 6/2019 | Yui ................... H01M 10/0585 |
| 2020/0220164 A1* | 7/2020 | Yokoyama ............ H01M 4/366 |

(Continued)

FOREIGN PATENT DOCUMENTS

| JP | 2010-135090 A | 6/2010 |
| JP | 2012-099323 A | 5/2012 |

(Continued)

OTHER PUBLICATIONS

U.S. Appl. No. 17/945,642, filed Sep. 15, 2022, Inventors: Masaru Kubota; et al.

*Primary Examiner* — Allison Bourke
*Assistant Examiner* — Travis L. Martin
(74) *Attorney, Agent, or Firm* — Dinsmore & Shohl LLP

(57) ABSTRACT

A composite particle includes a positive electrode active material particle and a coating film. In a method for producing the composite particle, the coating film covers at least a part of a surface of the positive electrode active material particle, the coating film contains a phosphorus compound, and a glass-transition temperature of the coating film is 300° C. or less.

13 Claims, 3 Drawing Sheets

(56) References Cited

U.S. PATENT DOCUMENTS

| 2022/0085347 A1 | 3/2022 | Kubota et al. | |
| 2023/0033163 A1* | 2/2023 | Isomura ................. | H01M 4/13 |
| 2023/0133143 A1* | 5/2023 | Suzuki ................. | H01M 4/131 |
| | | | 429/223 |

FOREIGN PATENT DOCUMENTS

| JP | 2022-047501 A | 3/2022 |
| WO | 2010/064127 A1 | 6/2010 |

* cited by examiner

1

METHOD FOR PRODUCING COMPOSITE PARTICLE, POSITIVE ELECTRODE, AND ALL-SOLID-STATE BATTERY, AND COMPOSITE PARTICLE, POSITIVE ELECTRODE, AND ALL-SOLID-STATE BATTERY

CROSS-REFERENCE TO RELATED APPLICATION

This application claims priority to Japanese Patent Application No. 2022-072096 filed on Apr. 26, 2022, incorporated herein by reference in its entirety.

BACKGROUND

1. Technical Field

The present disclosure relates to a method for producing a composite particle, a positive electrode, and an all-solid-state battery, and the composite particle, the positive electrode, and the all-solid-state battery.

2. Description of Related Art

Japanese Unexamined Patent Application Publication No. 2010-135090 (JP 2010-135090 A) discloses a positive electrode active material that is formed by a gas phase method and that has a reaction suppression unit consisting of a polyanion structure-containing compound containing lithium, and an all-solid-state battery including the positive electrode active material.

SUMMARY

It has been proposed to form a coating film on the surface of a positive electrode active material particle. For example, in a sulfide-based all-solid-state battery, resistance is expected to be reduced due to inhibition of direct contact between a sulfide solid electrolyte and the positive electrode active material particle by the coating film. However, there is room for improvement in reducing the resistance.

Accordingly, an object of the present disclosure is to reduce the resistance.

A technical configuration and effects of the present disclosure will be described below. However, an effect mechanism of the present specification includes speculation. The effect mechanism does not limit the technical scope of the present disclosure.

[1] The present disclosure is a method for producing a composite particle. The composite particle includes a positive electrode active material particle and a coating film. The coating film covers at least a part of a surface of the positive electrode active material particle. The coating film contains a phosphorus compound. A glass-transition temperature (Tg) of the coating film is 300° C. or less.

A technique of covering the positive electrode active material particle containing lithium (Li) with a compound containing phosphorus (P) is well known, but the conventional technique cannot reduce the resistance to a level sufficient for practical use. In an all-solid-state battery, the formation of an interface between the positive electrode active material and the sulfide solid electrolyte (hereinafter also simply referred to as "solid electrolyte") is important, and the diffusion path of Li ions is formed by bonding at the atomic level, and an improvement in the ion conductivity is expected.

The coating film on the surface of the positive electrode active material particle is required to function as a buffer layer for suppressing the reaction between the positive electrode active material and the solid electrolyte, but the coating film also plays an important role in the adhesion between the positive electrode active material and the solid electrolyte.

The present inventors have found that the composite particle including the coating film containing P and having the Tg of 300° C. or less has flexibility that conventional positive electrode active material particle does not have. Due to the composite particle including such a coating film, the resistance is expected to be reduced.

[2] The method may include the following (a) and (b).

(a) Prepare a mixture by mixing a coating solution and the positive electrode active material particle.

(b) Produce the composite particle by drying the mixture by a spray drying method.

The coating solution contains a solute and a solvent.

The coating film can be generated due to drying of the coating solution adhering to the surface of the positive electrode active material particle by the spray drying method. The coating film according to [1] can be generated by the coating solution according to [2].

[3] The coating solution may satisfy, for example, a relationship of the following formula (1).

$$0 \leq n_{Li}/n_P < 1.1 \tag{1}$$

In the above formula (1), $n_{Li}$ indicates molar concentration of lithium in the coating solution, and $n_P$ indicates molar concentration of phosphorus in the coating solution.

[4] A method for producing a positive electrode may include the following (c) to (e).

(c) Prepare a positive electrode slurry including the composite particle produced by the method according to any one of [1] to [3] and a sulfide solid electrolyte.

(d) Form a positive electrode active material layer by applying the positive electrode slurry to a surface of a positive electrode current collector.

(e) Produce the positive electrode by rolling the positive electrode active material layer and the positive electrode current collector at 170° C. or higher.

The positive electrode active material layer is formed by applying the positive electrode slurry including the composite particle described above and the solid electrolyte to the surface of the positive electrode current collector. By rolling the positive electrode current collector on which the positive electrode active material layer is formed at 170° C. or higher, the positive electrode active material layer is densified, the adhesion between the coating film and the solid electrolyte is improved, and the resistance is expected to be reduced.

[5] In (e), the positive electrode active material layer having a filling rate of 90% or more may be obtained.

[6] A method for producing an all-solid-state battery includes the positive electrode produced by the method according to [4] or [5].

[7] A composite particle includes a positive electrode active material particle and a coating film. The coating film covers at least a part of a surface of the positive electrode active material particle. The coating film contains a phosphorus compound. A glass-transition temperature (Tg) of the coating film is 300° C. or less.

[8] The composite particle may satisfy a relationship of the following formula (2).

$$C_{Li}/C_P \leq 2.5 \qquad (2)$$

In the above formula (2), $C_{Li}$ indicates elemental concentration of lithium (Li) obtained from a peak area of a Li1s spectrum measured by X-ray photoelectron spectroscopy (XPS), and $C_P$ indicates elemental concentration of phosphorus (P) obtained from a peak area of a P2p spectrum measured by the X-ray photoelectron spectroscopy.

[9] A positive electrode includes a positive electrode active material layer and a positive electrode current collector. The positive electrode includes the composite particle according to [7] or [8] and a sulfide solid electrolyte.

[10] A filling rate of the positive electrode active material layer may be 90% or more.

[11] An all-solid battery includes the positive electrode according to [9] or [10].

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
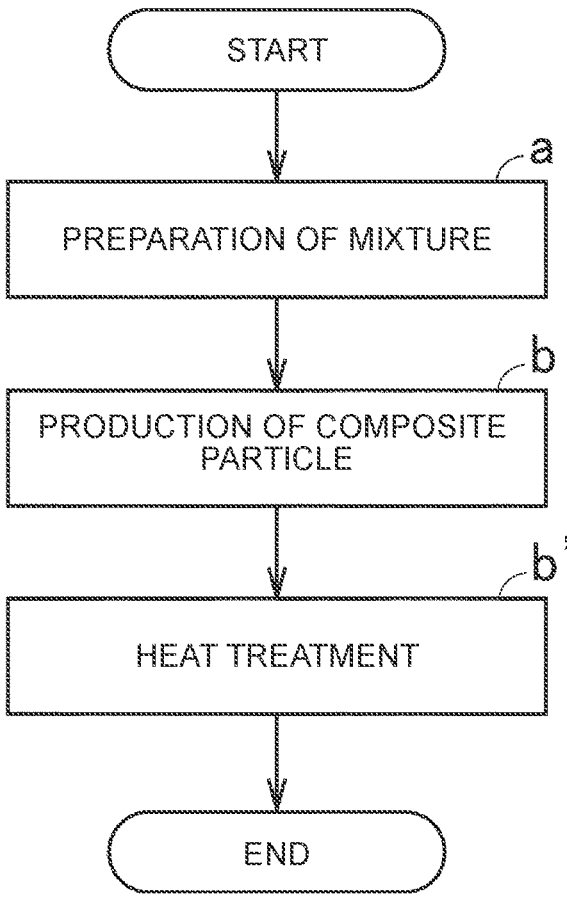
FIG. 1 is an example of a schematic flowchart of a method for producing a composite particle in the present embodiment.

Hereinafter, embodiments of the present disclosure (hereinafter can be abbreviated as the "present embodiment") and examples of the present disclosure (hereinafter can be abbreviated as the "present example") will be described. However, the present embodiment and the present example do not limit the technical scope of the present disclosure.

Definitions of Terms

Statements of "comprising," "including," and "having," and variations thereof (for example "composed of") are open-ended formats. The open-ended format may or may not include an additional element in addition to a required element. A statement of "consisting of" is a closed format. However, even when the statement is the closed format, normally associated impurities and additional elements irrelevant to the disclosed technique are not excluded. A statement "substantially consisting of" is a semi-closed format. The semi-closed format allows addition of an element that does not substantially affect the basic and novel characteristics of the disclosed technique.

Expressions such as "may" and "can" are used in the permissive sense of "having the possibility of" rather than in the obligatory sense of "must".

An element expressed in a singular form also includes plural forms of elements unless otherwise specified. For example, a "particle" can mean not only "one particle" but also "a collection of particles (powder particles, powder, particle group)".

For multiple steps, actions, operations, and the like included in various methods, the execution order thereof is not limited to the described order unless otherwise specified. For example, the multiple steps may proceed concurrently. For example, the multiple steps may occur one after the other.

For example, numerical ranges such as "m % to n %" include upper and lower limit values unless otherwise specified. That is, "m % to n %" indicates a numerical range of "m % or more and n % or less". In addition, "m % or more and n % or less" includes "more than m % and less than n %". Further, a numerical value selected as appropriate from within the numerical range may be used as a new upper limit value or a new lower limit value. For example, a new numerical range may be set by appropriately combining numerical values within the numerical range with numerical values described in other parts of the present specification, tables, drawings, and the like.

When a compound is represented by a stoichiometric composition formula (for example, "LiCoO$_2$"), the stoichiometric composition formula is only a representative example of the compound. The compound may have a non-stoichiometric composition. For example, when lithium cobalt oxide is expressed as "LiCoO$_2$", unless otherwise specified, the lithium cobalt oxide is not limited to a composition ratio of "Li/Co/O=1/1/2", and can include Li, Co and O in any composition ratio. Further, doping with trace elements, substitution, etc. can also be permitted.

"D50" indicates a particle diameter in which the accumulation of the frequency from a side where the particle diameter is small reaches 50% in the volume-based particle diameter distribution. "D50" can be measured by a laser diffraction method. For example, the laser diffraction particle size analyzer "product name: SALD-7500" available from Shimadzu Corporation (or equivalent thereto) may be used.

Measurement by DSC

The Tg of a coating film can be measured by the following procedure. A differential scanning calorimetry (DSC) device is provided. For example, the DSC device "product name: DSC7000X" available from Hitachi High-Tech Corporation (or equivalent thereto) may be used. A sample powder is prepared by drying a coating solution. 3 mg of the sample powder is introduced into a pressure-resistant stainless steel container in a glove box (dew point: −70° C.) filled with argon (Ar) gas, and a lid is crimped and sealed. The pressure-resistant stainless steel container is taken out from the glove box and heated from the room temperature to 500° C. at the temperature raising speed of 1° C./min under a nitrogen (N) gas flow using the DSC device. In the obtained profile (vertical axis: heat amount, horizontal axis: temperature), the Tg is read from a region where the baseline shifts.

Filling Rate Measurement

The filling rate can be measured by the following procedure. In the positive electrode cut into a predetermined area, the area, the thickness, and the mass of the positive electrode active material layer are measured, and the apparent density of the positive electrode active material layer is obtained (apparent density of positive electrode active material layer=mass/(area×thickness)). Next, the true density of the positive electrode active material layer is obtained from the true density and the content of the components of the positive electrode active material layer (true density of positive electrode active material layer=mass/E (content of each component/true density of each component)). The filling rate (%) is obtained by dividing the apparent density by the true density.

Measurement by XPS

Composition Ratio of Particle Surface $C_{Li}$ and $C_P$ in the above formula (2) can be measured by the following procedure. An X-ray photoelectron spectroscope (XPS) device is prepared. For example, the XPS device "product name: PHIX-tool" available from ULVAC-PHI, Inc. (or equivalent thereto) may be used. A sample powder consisting of a composite particle is set in the XPS device. The pass energy of 224 eV is used to perform narrow-scan analysis. The measurement data is processed by an analysis software. For example, the analysis software "product name: MulTiPak" available from ULVAC-PHI, Inc. (or equivalent thereto) may be used. The peak area (integral value) of the Li1s spectrum is converted to the elemental concentration of Li ($C_{Li}$). The peak area of the P2p spectrum is converted to the elemental concentration of P ($C_P$). The composition ratio ($C_{Li}/C_P$) of the particle surface is obtained by dividing $C_{Li}$ by $C_P$.

Coverage Rate

The coverage rate is also measured by the XPS. By analyzing the above measurement data, the ratio of each element is obtained from each peak area of C1s, O1s, P2p, and M2p3.

The coverage rate is obtained using the following formula (3).

$$\theta = P/(P+M) \times 100 \qquad (3)$$

In the above formula (3), $\theta$ indicates the coverage rate (%). P and M indicate the ratio of each element.

Note that "M2p3" and M in the above formula (3) are constituent elements of the positive electrode active material particle and indicate elements other than Li and oxygen (O). That is, the positive electrode active material particle may be represented by the following formula (3).

$$LiMO_2 \qquad (4)$$

M may consist of one element or may consist of a plurality of elements. M may be, for example, at least one selected from the group consisting of nickel (Ni), cobalt (Co), manganese (Mn), and aluminum (Al). When M includes a plurality of elements, the sum of the composition ratio of each element may be 1.

For example, when the positive electrode active material particle is "$LiNi_{1/3}Co_{1/3}Mn_{1/3}O_2$", the above formula (3) can be transformed into the following formula (3').

$$\theta = P/(P+Ni+Co+Mn) \times 100 \qquad (3')$$

Ni in the above formula (3') indicates the element ratio of nickel obtained from the peak area of Ni2p3. Co indicates the element ratio of cobalt obtained from the peak area of Co2p3. Mn indicates the element ratio of manganese obtained from the peak area of Mn2p3.

Film Thickness Measurement

The film thickness (thickness of coating film) can be measured by the following procedure. A sample is prepared by embedding the composite particle in a resin material. The sample is subjected to a cross-sectional process by an ion milling device. For example, the ion milling device "product name: IM4000PLUS" available from Hitachi High-Tech Corporation (or equivalent thereto) may be used. A cross section of the sample is observed by a scanning electron microscope (SEM). For example, the SEM device "product name: Regulus8100" available from Hitachi High-Tech Corporation (or equivalent thereto) may be used. For each of the 10 composite particles, the film thicknesses is measured from 5 points of view. The arithmetic average of a total of film thicknesses at 50 portions is regarded as the film thickness.

Measurement by ICP

Composition Ratio of Positive Electrode Active Material Particle

The composition ratio of the positive electrode active material particle can be measured by the following procedure. A standard solution is prepared by dilution of 0.01 g of the positive electrode active material particle with pure water. An inductively coupled plasma atomic emission spectroscopy (ICP-AES) device is prepared. For example, the ICP-AES device "product name: ICPE-9000" available from Shimadzu Corporation (or equivalent thereto) may be used. The light emission intensity of the standard solution is measured by the ICP-AES device. A calibration curve is created from the light emission intensity of the standard solution. From the light emission intensity of the sample solution and the calibration curve, the molar fraction of Li and M contained in the positive electrode active material particle is obtained.

P Adhesion Amount

The mass fraction of P contained in the composite particle (also referred to as "P adhesion amount" and "P content") can be measured by the following procedure. By mixing hydrochloric acid, nitric acid, and sulfuric acid, a mixed acid is prepared. The mixing ratio is "hydrochloric acid/nitric acid/sulfuric acid=2/3/1 (molar ratio)". By dissolving the composite particle in the mixed acid, a solution is prepared. A sample solution is prepared by dilution of 0.01 g of the solution to 100 mL with pure water. An aqueous solution of P (1000 ppm, 10000 ppm) is prepared. A standard solution is prepared by dilution of 0.01 g of the aqueous solution with pure water. The ICP-AES device is prepared. The light emission intensity of the standard solution is measured by the ICP-AES device. A calibration curve is created from the light emission intensity of the standard solution. From the light emission intensity of the sample solution and the calibration curve, the mass fraction of P contained in the composite particle is obtained.

Mass Concentration of Li, P, and Na in Coating Solution

The mass concentration of Li, P, and Na in the coating solution is measured by the following procedure. 100 ml of a sample solution is prepared by dilution of 0.01 g of the coating solution with pure water. An aqueous solution of Li, P, and Na (1000 ppm, 10000 ppm) is prepared. A standard solution is prepared by dilution of 0.01 g of the aqueous solution with pure water. The ICP-AES device is prepared. The light emission intensity of the standard solution is measured by the ICP-AES device. A calibration curve is created from the light emission intensity of the standard solution. The light emission intensity of the sample solution (diluted solution of the coating solution) is measured by the ICP-AES device. From the light emission intensity of the sample solution and the calibration curve, the mass concentration of Li, P, and Na in the coating solution is obtained. Further, the mass concentration of Li and P is converted into molar concentration. The molar ratio ($n_{Li}/n_P$) is obtained by dividing the molar concentration of Li ($n_{Li}$) by the molar concentration of P ($n_P$).

Method for Producing Composite Particle

The composite particle produced by the method for producing the composite particle in the present embodiment includes the positive electrode active material particle and the coating film. The coating film covers at least a part of a surface of the positive electrode active material particle. The coating film contains a phosphorus compound. The Tg of the coating film is 300° C. or less.

FIG. 1 is an example of a schematic flowchart of the method for producing the composite particle in the present embodiment. The method for producing the composite particle includes "(a) preparation of mixture" and "(b) production of composite particle". The method for producing the composite particle may further include, for example, "(b') heat treatment". In addition, the method for producing the composite particle is an example, and is not limited to these.

(a) Preparation of Mixture

The method for producing the composite particle includes preparing a mixture by mixing the coating solution and the positive electrode active material particle. The mixture may be, for example, a suspension or a wet powder. For example, the suspension may be formed by dispersion of the positive electrode active material particle (powder) in the coating solution. For example, the wet powder may be formed by spraying of the coating solution in the powder. In the method for producing the composite particle, any mixing device, granulating device, or the like can be used.

The coating solution contains a solute and a solvent. The solute includes a film material (raw material for the coating film). The coating solution may further include, for example, a suspended solid (insoluble component), a precipitate, and the like.

The solute may contain, for example, the phosphate compound. Thereby, the solute can contain P. The phosphate compound may be at least one selected from the group consisting of, for example, phosphoric anhydride ($P_2O_5$), orthophosphoric acid, pyrophosphoric acid, metaphosphoric acid [$(HPO_3)_n$], and polyphosphoric acid. The phosphate compound may be at least one selected from the group consisting of, for example, the metaphosphoric acid and the polyphosphoric acid. The metaphosphoric acid and the polyphosphoric acid can have a longer molecular chain than other phosphate compounds. The phosphate compound has a longer molecular chain, so that it is considered that the coating film having continuity is likely to be generated. When the coating film has continuity, for example, an improvement in the coverage rate is expected.

The solute may further contain sodium (Na). Na is dissolved in the coating solution, so that the stability of the phosphate compound may further improve. The concentration of Na in the coating solution (mass concentration) may be, for example, 0% to 1%. The concentration of Na may be, for example, 0.6% or less, or 0.5% or less. The concentration of Na may be, for example, 0.5% to 0.6%.

The solute may further contain a lithium compound. The solute may contain, for example, lithium hydroxide, lithium carbonate, lithium nitrate, and the like. The molar ratio of Li to P ($n_{Li}/n_P$) may be, for example, less than 1.1 [see the above formula (1)]. The molar ratio ($n_{Li}/n_P$) is less than 1.1, so that decrease in the composition ratio ($C_{Li}/C_P$) of the particle surface is expected. The molar ratio ($n_{Li}/n_P$) may be, for example, 1.00 or less, 0.75 or less, 0.45 or less, or zero. The molar ratio ($n_{Li}/n_P$) may be, for example, 0 to 0.75 or 0 to 1.00.

The positive electrode active material particles may be secondary particles (aggregates of primary particles). The positive electrode active material particle (secondary particle) may have, for example, D50 of 1 μm to 50 μm, D50 of 1 μm to 20 μm, or D50 of 5 μm to 15 μm.

The positive electrode active material particle 1 can include any component. The positive electrode active material particle 1 contains a lithium-containing composite oxide having a layered rock salt structure. The lithium-containing composite oxide is represented by, for example, the following formula (5).

$$Li_aMO_2 \tag{5}$$

In the above formula (5), M contains at least one selected from the group consisting of Ni, Co, Mn, and Al, and a may satisfy the relationship of $0.90 \le a \le 1.20$. The lithium-containing composite oxide may be, for example, $Li_{1.10}Ni_{1/3}Co_{1/3}Mn_{1/3}O_2$, $Li_{1.10}Ni_{0.50}Co_{0.20}Mn_{0.30}O_2$, $Li_{1.10}Ni_{0.60}Co_{0.20}Mn_{0.20}O_2$, $Li_{1.10}Ni_{0.80}Co_{0.10}Mn_{0.10}O_2$, or the like.

(b) Production of Composite Particle

The method for producing the composite particle includes production of the composite particle by drying the mixture. The coating film is generated due to drying of the coating solution adhering to the surface of the positive electrode active material particle.

In the method for producing the composite particle, the composite particle may be formed by a spray drying method. That is, droplet is formed by spraying of the suspension from a nozzle. The droplet includes the positive electrode active material particle and the coating solution. For example, the composite particle can be formed by drying of the droplet with hot air. By using the spray drying method, for example, an improvement in the coverage rate is expected.

The solid content of the suspension for spray drying may be, for example, 1% to 50% volume fraction or 10% to 30% volume fraction. The nozzle diameter may be, for example, 0.1 mm to 10 mm or 0.1 mm to 1 mm. The hot air temperature may be, for example, 100° C. to 200° C.

The coating film covers at least a part of a surface of the positive electrode active material particle. The coating film contains a phosphorus compound. The coating film contains the phosphorus compound, so that the resistance is expected to be reduced. The coating film may further contain Li.

The Tg of the coating film is 300° C. or less. The Tg of the coating film is 300° C. or less, so that the flexibility of the coating film is increased, and the resistance is expected to be reduced. In some embodiments, the Tg of the coating film is 250° C. or less, or 200° C. or less.

The Tg of the coating film can be adjusted by $n_{Li}/n_P$ in the coating solution. The smaller $n_{Li}/n_P$ in the coating solution is, the lower the Tg of the coating film tends to be.

The composite particle may be produced by, for example, a rolling fluidized bed coating machine. In the rolling fluidized bed coating machine, "(a) preparation of mixture" and "(b) production of composite particle" can be performed simultaneously.

(b') Heat Treatment

The method for producing the composite particle may include subjecting the composite particle to heat treatment. The coating film can be fixed by the heat treatment. The heat treatment can also be referred to as "firing". Any heat treatment device can be used in the method for producing the composite particle. The heat treatment temperature may be, for example, 150° C. to 300° C. The heat treatment time may be, for example, 1 hour to 10 hours. For example, the heat treatment may be performed in air, or the heat treatment may be performed in an inert atmosphere.

Method for Producing Positive Electrode

Figure 2:
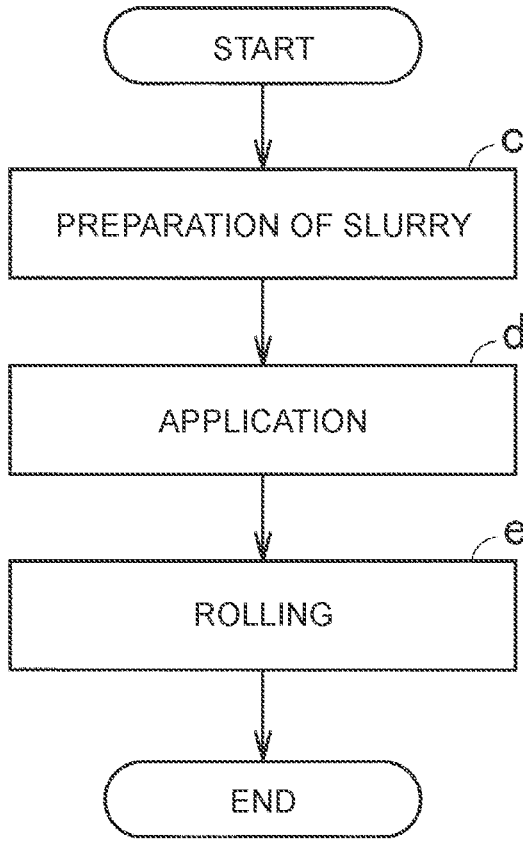
FIG. 2 is an example of a schematic flowchart of a method for producing a positive electrode in the present embodiment.

FIG. 2 is an example of a schematic flowchart of a method for producing a positive electrode in the present embodiment. The method for producing the positive electrode includes "(c) preparation of slurry", "(d) application", and "(e) rolling". The method for producing the positive electrode is an example, and is not limited to these.

(c) Preparation of Slurry

The method for producing the positive electrode includes preparing a positive electrode slurry including the composite particle and the solid electrolyte. The positive electrode slurry is prepared, for example, by dispersion of the composite particle and the solid electrolyte in a dispersion medium. Any mixing device, stirring device, or dispersing device can be used in the method for producing the positive electrode.

The positive electrode slurry may be prepared so as to further include a conductive material, a binder, etc. in addition to the composite particle and the solid electrolyte. The dispersion medium is selected according to a type of binder and the like. The dispersion medium may contain, for example, heptane, N-methyl-pyrrolidone (NMP), and the like. For example, the viscosity of the positive electrode slurry may be adjusted by the amount of the dispersion medium used.

The sulfide solid electrolyte contains, for example, Li, P, and sulfur (S). The sulfide solid electrolyte may further contain, for example, 0, silicon (Si), and the like. The sulfide solid electrolyte may further contain, for example, halogen and the like. The sulfide solid electrolyte may further contain, for example, iodine (I), bromine (Br), and the like. The sulfide solid electrolyte may be, for example, glass ceramics or argyrodite. The sulfide solid electrolyte may contain at least one selected from the group consisting of, for example, $LiI$—$LiBr$—$Li_3PS_4$, $Li_2S$—$SiS_2$, $LiI$—$Li_2S$—$SiS_2$, $LiI$—$Li_2S$—$P_2S_5$, $LiI$—$Li_2O$—$Li_2S$—$P_2S_5$, $LiI$—$Li_2S$—$P_2O_5$, $LiI$—$Li_3PO_4$—$P_2S_5$, $Li_2S$—$P_2S_5$, and $Li_3PS_4$. The blending amount of the sulfide solid electrolyte may be, for example, 1 to 200 parts by volume, 50 to 150 parts by volume, or 50 to 100 parts by volume, with respect to 100 parts by volume of the composite particle (positive electrode active material).

The conductive material can contain any component. The conductive material may contain at least one selected from the group consisting of, for example, carbon black, vapor growth carbon fiber (VGCF), a carbon nanotube (CNT), and a graphene flake. The blending amount of the conductive material may be, for example, 0.1 to 10 parts by mass with respect to 100 parts by mass of the composite particle (positive electrode active material).

The binder can contain any component. The binder may contain at least one selected from the group consisting of, for example, polyvinylidene fluoride (PVdF), vinylidene fluoride-hexafluoropropylene copolymer (PVDF-HFP), styrene butadiene rubber (SBR), and polytetrafluoroethylene (PTFE). The blending amount of the binder may be, for example, 0.1 to 10 parts by mass with respect to 100 parts by mass of the composite particle (positive electrode active material).

(d) Application

The method for producing the positive electrode includes forming the positive electrode active material layer by applying the positive electrode slurry to the surface of a positive electrode current collector. The positive electrode slurry is applied to the surface of the positive electrode current collector by, for example, an application device. Any application device can be used in the method for producing the positive electrode. The applied positive electrode slurry is dried. For example, a paint film is dried by heating or hot air. Thereby, the positive electrode active material layer can be formed. The positive electrode active material layer may be formed to have a thickness of, for example, 10 μm to 200 μm.

The positive electrode current collector may include, for example, an aluminum (Al) foil or the like. The positive electrode current collector may have, for example, a thickness of 5 μm to 50 μm.

(e) Rolling

The method for producing the positive electrode includes producing the positive electrode by rolling the positive electrode active material layer and the positive electrode current collector at 170° C. or higher. The positive electrode active material layer and the positive electrode current collector are rolled at 170° C. or higher, so that the flexibility of the coating film in the positive electrode active material layer is increased, and the adhesion with the solid electrolyte is improved. As a result, voids between the composite particle and the solid electrolyte that do not contribute to charging and discharging are reduced, and the resistance is expected to be reduced. Further, when the rolling temperature is too high, the solid electrolyte may deteriorate. Therefore, for example, in some embodiments, the positive electrode active material layer and the positive electrode current collector may be rolled at 200° C. or less.

The positive electrode active material layer and the positive electrode current collector are rolled by, for example, a roll press machine. Any roll press machine can be used in the method for producing the positive electrode. For example, in a roll press machine having two rotating rollers, an integral body of the positive electrode active material layer and the positive electrode current collector may be passed through a space between the rollers of the roll press machine.

For example, in the roll press machine having two rotating rollers, the positive electrode active material layer and the positive electrode current collector are rolled by heating at least one of the two rollers to a temperature of 170° C. or higher. The temperature of the roller may be, for example, 200° C. or less. The temperature of the roller means the temperature of the roller surface.

The technique for heating the roller is not particularly limited, and for example, a heater or the like is used. Examples of the heater include an infrared rays heater (IR heater) and an electric heater.

The positive electrode active material layer having the filling rate of 90% or more may be obtained by rolling. When the positive electrode active material layer has the filling rate of 90% or more, the resistance is expected to be further reduced. By rolling, for example, the positive electrode active material layer having the filling rate of 93% or more may be obtained, the positive electrode active material layer having the filling rate of 94% or more may be obtained, or the positive electrode active material layer having the filling rate of 95% or more may be obtained. By rolling, for example, the positive electrode active material layer having the filling rate of 100% may be obtained, the positive electrode active material layer having the filling rate of 99% or less may be obtained, or the positive electrode active material layer having the filling rate of 97% or less may be obtained. The filling rate of the positive electrode active material layer by rolling may be, for example, 90% to 95%.

The positive electrode raw material is produced by rolling. The raw material can be cut into a predetermined planar size according to the specification of the battery.

Method for Producing all-Solid-State Battery

A method for producing an all-solid-state battery includes "(f) production of all-solid-state battery including positive electrode". For example, a negative electrode and a separator layer are each provided. For example, a laminate is formed by laminating the positive electrode, the separator layer, and the negative electrode in this order. A power generation element can be formed by subjecting the laminate to press working. A terminal or the like is connected to the power generation element. The all-solid-state battery can be produced by enclosing the power generation element in an exterior body.

For example, a negative electrode slurry may be prepared by mixing a negative electrode active material particle, the sulfide solid electrolyte, the conductive material, the binder, and the dispersion medium. The dispersion medium may contain, for example, heptane, butyl butyrate, and the like. The slurry is applied to the surface of a negative electrode current collector, so that a negative electrode active material layer may be produced. The negative electrode active material layer includes a negative electrode composite material. The negative electrode composite material includes the negative electrode active material particle and the sulfide solid electrolyte. The negative electrode composite material may further include the conductive material and the binder. The negative electrode active material layer may be compressed after drying. The negative electrode active material layer may have, for example, a thickness of 10 μm to 200 μm. The negative electrode active material particle can contain any component. The negative electrode active material particle may contain at least one selected from the group consisting of, for example, graphite, Si, $SiO_x$($0<x<2$), and $Li_4Ti_5O_{12}$. The sulfide solid electrolytes may be the same as or different from each other between the negative electrode composite material and the positive electrode composite material. The conductive material and the binder may be the same as or different from each other between the negative electrode composite material and the positive electrode composite material. The negative electrode current collector may contain, for example, a copper (Cu) foil, an Ni foil, and the like. The negative electrode current collector may have, for example, a thickness of 5 μm to 50 μm.

For example, the separator layer may be formed by pressing the sulfide solid electrolyte. For example, a slurry may be prepared by mixing the sulfide solid electrolyte, the binder, and the dispersion medium. For example, the separator layer may be formed by applying the slurry to the surface of the electrode (positive electrode or negative electrode). For example, the separator layer may be formed by applying the slurry to the surface of a temporary support body (for example, metal foil). The separator layer may be transferred from the temporary support body to the surface of the electrode. The same kind of sulfide solid electrolyte may be used or the different kind of sulfide solid electrolyte may be used between the positive electrode, the separator layer, and the negative electrode.

Composite Particle

The composite particle includes the positive electrode active material particle and the coating film. The coating film covers at least a part of a surface of the positive electrode active material particle. The coating film contains a phosphorus compound. A glass-transition temperature (Tg) of the coating film is 300° C. or less.

Figure 3:
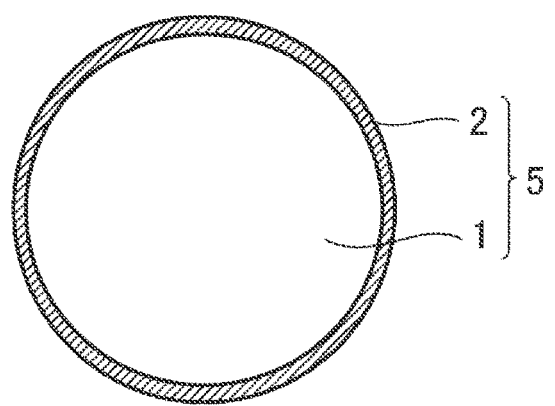
FIG. 3 is a conceptual diagram showing the composite particle in the present embodiment.

FIG. 3 is a conceptual diagram showing the composite particle in the present embodiment. The composite particle 5 is produced by the production method described above. The composite particle 5 can be referred to as, for example, a "covered positive electrode active material" or the like. The composite particle 5 includes the positive electrode active material particle 1 and the coating film 2. The composite particle 5 may form, for example, aggregates. That is, one composite particle 5 may include two or more positive electrode active material particles 1. The positive electrode active material particle 1 is a core of the composite particle 5. Details of the positive electrode active material particle 1 are as described above.

The coating film 2 is a shell of the composite particle 5. The coating film may have, for example, a thickness of 5 nm to 100 nm, a thickness of 5 nm to 50 nm, a thickness of 10 nm to 30 nm, or a thickness of 20 nm to 30 nm. The coating film 2 may further contain, for example, oxygen (O), carbon (C), and the like. P may be contained in mass fraction, for example, 0.2% to 10% with respect to the composite particle. Details of the coating film 2 are as described above.

In the composite particle, in some embodiments, the composition ratio ($C_{Li}/C_P$) of the particle surface is 3.5 or less and 2.5 or less [see the above formula (2)]. When the composition ratio ($C_{Li}/C_P$) is 2.5 or less, the resistance can be further reduced. The composition ratio ($C_{Li}/C_P$) may be, for example, 1.96 or less, or 1.73 or less. The composition ratio ($C_{Li}/C_P$) may be zero. The composition ratio ($C_{Li}/C_P$) may be, for example, 0.1 or more, 0.5 or more, or 1.0 or more. The composition ratio ($C_{Li}/C_P$) may be, for example, 1.73 to 2.65.

The coverage rate may be, for example, 80% or more, 85% or more, or 90% or more. Details of the composite particle 5 are as described above.

Positive Electrode

The positive electrode 10 is layered. The positive electrode 10 includes the positive electrode active material layer and the positive electrode current collector. The positive electrode active material layer adheres closely to the separator layer 30. The positive electrode active material layer includes the positive electrode composite material. The positive electrode composite material includes the composite particle and the sulfide solid electrolyte. The sulfide solid electrolyte can form an ion conduction path in the positive electrode active material layer. The positive electrode active material layer may further include, for example, the conductive material and the binder. The conductive material can form an electron conduction path in the positive electrode active material layer. Details of the positive electrode 10 are as described above.

All-Solid-State Battery

Figure 4:
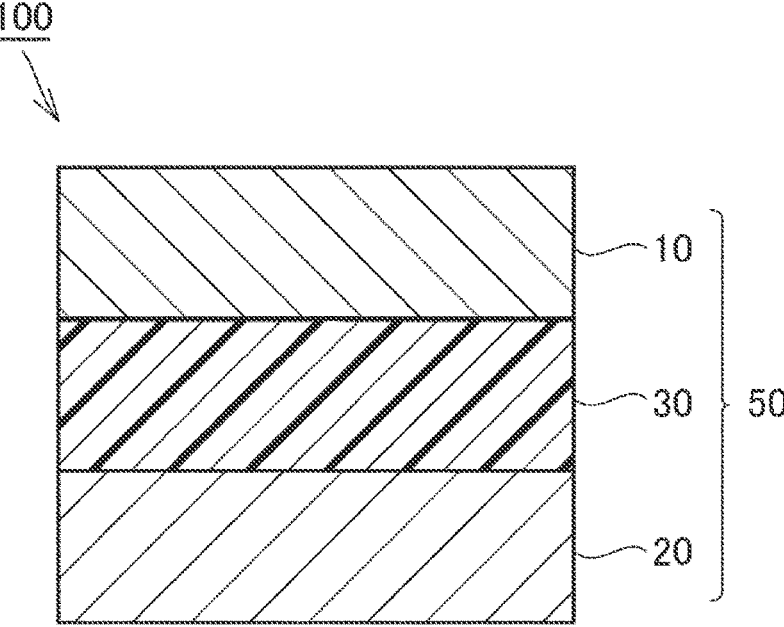
FIG. 4 is a conceptual diagram showing an all-solid-state battery in the present embodiment.

FIG. 4 is a conceptual diagram showing the all-solid-state battery in the present embodiment. An all-solid-state battery 100 may include, for example, the exterior body (not shown). The exterior body may be, for example, a pouch made of an aluminum laminated film. The exterior body may store a power generation element 50. The power generation element 50 includes the positive electrode 10, the separator layer 30, and the negative electrode 20. That is, the all-solid-state battery 100 includes the positive electrode 10, the separator layer 30, and the negative electrode 20.

Negative Electrode

The negative electrode 20 is a counter electrode of the positive electrode 10. The negative electrode 20 is layered. The negative electrode 20 includes the negative electrode active material layer and the negative electrode current collector. The negative electrode active material layer adheres closely to the separator layer 30. Details of the negative electrode 20 are as described above.

Separator Layer

The separator layer 30 is interposed between the positive electrode 10 and the negative electrode 20. The separator layer 30 separates the positive electrode 10 from the negative electrode 20. Details of the separator layer 30 are as described above.

Hereinafter, the present embodiment will be described using the present example, but the present embodiment is not limited thereto.

Production of Positive Electrode Active Material Particle

A positive electrode active material particle, which is a lithium-containing composite oxide having a layered rock salt structure, was produced as follows.

Nickel(II) sulfate hexahydrate ($NiSO_4 \cdot 6H_2O$), cobalt(II) sulfate heptahydrate ($CoSO_4 \cdot 7H_2O$), and manganese(II) sulfate pentahydrate ($MnSO_4 \cdot 5H_2O$) were dissolved in pure water to obtain a raw material aqueous solution. The molar ratio of Ni, Co, and Mn in the raw material aqueous solution was 1:1:1, and the total molar concentration of Ni, Co, and Mn in the raw material aqueous solution was 1.8 mol/L.

1 L of aqueous ammonia solution with the ammonia concentration of 10 g/L was prepared in a reaction vessel. Precipitation was formed by adjustment of the pH such that the pH is within 11.20±0.2 using a sodium hydroxide aqueous solution while 1 L of the raw material aqueous solution was added dropwise to the reaction vessel at a speed of 5.2 mL/min, and a precursor was obtained. From the start to the end of the precipitation reaction, the ammonia aqueous solution was appropriately added such that the ammonia concentration of the reaction solution was 10 g/L.

Lithium carbonate ($Li_2CO_3$) was mixed with the precursor such that the molar ratio of Li to Ni, Co, and Mn was 1.10, and the mixture was fired at 800° C. for 5 hours in an oxygen atmosphere to obtain a positive electrode active material particle. According to the above-described procedure, the composition of the positive electrode active material particle was measured. The composition of the positive electrode active material particle was $Li_{1.10}Ni_{1/3}Co_{1/3}Mn_{1/3}O_2$.

Production of All-Solid-State Battery

Composite particles, positive electrodes, and all-solid-state batteries according to Nos. 1 to 7 were produced as follows. Hereinafter, for example, a "composite particle according to No. 1" can be abbreviated as "No. 1".

No. 1

Coating Solution

A coating solution was prepared by dissolving 10.8 parts by mass of metaphosphoric acid (available from FUJIFILM Wako Pure Chemical Corporation) in 166 parts by mass of ion-exchanged water. Further, lithium hydroxide monohydrate ($LiOH \cdot H_2O$) was dissolved in the coating solution such that the molar ratio ($n_{Li}/n_P$) was 0.75. The Tg was measured by the procedure described above. The results are shown in Table 1 below. In Nos. 2 to 7 to be described below, the Tg is measured in the same manner as No. 1.

Positive Electrode

The positive electrode active material particle described above was prepared. A suspension was prepared by dispersion of 50 parts by mass of powder of the positive electrode active material particle in 53.7 parts by mass of the coating solution. The spray dryer "product name: Mini Spray Dryer B-290" available from BUCHI was prepared. Powder of the composite particle was produced by supply of the suspension to the spray dryer. The air supply temperature of the spray dryer was 200° C., and the air supply volume was 0.45 $m^3$/min. The composite particle was subjected to heat treatment in the air. The heat treatment temperature was 200° C. The heat treatment time was 5 hours. The composition ratio ($C_{Li}/C_P$) of the particle surface was measured by the procedure described above. The results are shown in Table 1 below. In Nos. 2 to 7 to be described below, the composition ratio ($C_{Li}/C_P$) of the particle surface is measured in the same manner as No. 1.

The following materials were prepared.

Sulfide solid electrolyte: $Li_{2S}$—$P_2S_5$ glass ceramic containing LiI (D50: 0.8 μm)

Conductive material: VGCF

Binder: SBR

Dispersion medium: Heptane

Positive electrode current collector: Al foil

The composite particle and the sulfide solid electrolyte were prepared. The composite particle and the sulfide solid electrolyte were weighed in a glove box filled with Ar gas (dew point: −30° C.). By mixing the above, the conductive material, the binder, and the dispersion medium, a positive electrode slurry was prepared. The mixing ratio was "composite particle/sulfide solid electrolyte=6/4 (volume ratio)". The blending amount of the conductive material was 3 parts by mass with respect to 100 parts by mass of the composite particle. The blending amount of the binder was 0.7 parts by mass with respect to 100 parts by mass of the composite particle. The positive electrode slurry was sufficiently stirred by the ultrasonic homogenizer "Model UH-50" available from SMT Co., Ltd. A paint film was formed by painting of the positive electrode slurry on the surface of the positive electrode current collector. The paint film was dried at 100° C. for 30 minutes by a hot plate. After being dried, the paint film was pressed at 100 kN with the roll press machine having two rotating rollers (roller temperature: 170° C.). As a result, the positive electrode raw material was produced. A disk-shaped positive electrode was cut out from the positive electrode raw material. The area of the positive electrode was 1 $cm^2$. The filling rate was measured by the procedure described above. The results are shown in Table 1 below. In Nos. 2 to 7 to be described below, the filling rate is measured in the same manner as No. 1.

Negative Electrode

As the sulfide solid electrolyte, the conductive material, the binder, and the dispersion medium, materials similar to those of the positive electrode were prepared. As a stirring device, the stirring device (product name: "FILMIX", model "30-L") available from PRIMIX Corporation was prepared. The sulfide solid electrolyte, the conductive material, the binder, and the dispersion medium were introduced into a stirring vessel of the stirring device. The materials in the stirring vessel were stirred for 30 minutes at a rotation speed of 20000 rpm.

$Li_4Ti_5O_{12}$ (D50: 1.0 μm) as the negative electrode active material particle and the Cu foil as the negative electrode current collector were prepared. The negative electrode active material particle was additionally introduced into the stirring vessel. Stirring was performed at 15000 rpm for 60 minutes. The mixing ratio between the negative electrode active material particle and the sulfide solid electrolyte was "composite particle/sulfide solid electrolyte=7/3 (volume ratio)". The blending amount of the conductive material was 1 part by mass with respect to 100 parts by mass of the composite particle. The blending amount of the binder was 2 parts by mass with respect to 100 parts by mass of the composite particle. After the negative electrode active material particle was introduced into the stirring vessel, the materials in the stirring vessel were stirred for 60 minutes at a rotation speed of 15000 rpm, and a negative electrode slurry was prepared. A paint film was formed by painting of the negative electrode slurry on the surface of the negative electrode current collector. The paint film was dried at 100° C. for 30 minutes by a hot plate. As a result, the negative electrode raw material was produced. A disk-shaped negative electrode was cut out from the negative electrode raw material. The area of the negative electrode was 1 $cm^2$.

Separator Layer

As the sulfide solid electrolyte, $Li_2S$—$P_2S_5$ glass ceramic (D50: 2.5 μm) containing LiI was prepared. As a mold for press working, a tubular ceramic with an inner diameter cross-sectional area of 1 cm$^2$ was prepared. 64.8 mg of the sulfide solid electrolyte was placed in the mold, smoothed, and then pressed and hardened with a pressure of 1 ton/cm$^2$ to obtain a separator layer.

All-Solid-State Battery

In the mold, the positive electrode was arranged on one side of the separator layer and the negative electrode was arranged on the other side of the separator layer. The negative electrode, the separator layer, and the positive electrode were pressed together for 1 minute at a pressure of 6 tons/cm$^2$. A power generation element was formed by inserting a stainless steel rod into the positive and negative electrodes and restraining the stainless steel rod at 0.3 tons/cm$^2$. As a housing, a pouch made of an aluminum laminated film was prepared. The battery element was enclosed in the housing. Thereby, an all-solid-state battery was formed.

No. 2

A coating solution was prepared by dissolving 10.8 parts by mass of metaphosphoric acid (available from FUJIFILM Wako Pure Chemical Corporation) in 166 parts by mass of ion-exchanged water. Further, lithium hydroxide monohydrate was dissolved in the coating solution such that the molar ratio ($n_{Li}/n_P$) was 0.45. Subsequently, as in No. 1, the composite particle, the positive electrode, and the all-solid-state battery were produced.

No. 3

A coating solution was prepared by dissolving 10.8 parts by mass of metaphosphoric acid (available from FUJIFILM Wako Pure Chemical Corporation) in 166 parts by mass of ion-exchanged water. Lithium hydroxide monohydrate was not added to the coating solution. Subsequently, as in No. 1, the composite particle, the positive electrode, and the all-solid-state battery were produced.

No. 4

A coating solution was prepared by dissolving 10.8 parts by mass of metaphosphoric acid (available from FUJIFILM Wako Pure Chemical Corporation) in 166 parts by mass of ion-exchanged water. Further, lithium hydroxide monohydrate was dissolved in the coating solution such that the molar ratio ($n_{Li}/n_P$) was 1.00. Subsequently, as in No. 1, the composite particle, the positive electrode, and the all-solid-state battery were produced.

No. 5

A coating solution was prepared by dissolving 10.8 parts by mass of metaphosphoric acid (available from FUJIFILM Wako Pure Chemical Corporation) in 166 parts by mass of ion-exchanged water. Further, lithium nitrate (LiNO$_3$) was dissolved in the coating solution such that the molar ratio ($n_{Li}/n_P$) was 2.00. Subsequently, as in No. 1, the composite particle, the positive electrode, and the all-solid-state battery were produced.

No. 6

870.4 parts by mass of hydrogen peroxide water (mass concentration: 30%) was introduced into the container. Next, 987.4 parts by mass of ion-exchanged water and 44.2 parts by mass of niobic acid [Nb$_2$O$_5$ 3H$_2$O] were introduced into the container. Next, 87.9 parts by mass of aqueous ammonia (mass concentration: 28%) was introduced into the container. A solution was formed by sufficiently stirring the contents of the container. The solution is believed to contain peroxo complexes of Nb. Further, a coating solution was prepared by dissolving 0.1 parts by mass of lithium hydroxide monohydrate in the solution. Subsequently, as in No. 1, the composite particle, the positive electrode, and the all-solid-state battery were produced.

Evaluation

The capacity of the evaluation battery was confirmed by constant current-constant voltage charging and constant current discharging. The time rate of charging and discharging was ⅓ C. "C" is a symbol indicating the time rate. At the time rate of 1 C, the full charging capacity of the battery is discharged in 1 hour.

The state of charge (SOC) of the evaluation battery was adjusted to 50% by the time rate of ⅓ C. After adjusting the SOC, the alternating current impedance was measured. The amplitude was 10 mV. The frequency range was 0.1 Hz to 106 Hz. Thereby, the Cole-Cole plot was created. The arc was fitted to the Cole-Cole plot. The distance between the two intersections of the fitted arc and the real axis was obtained. This distance was regarded as the "interfacial resistance". The interfacial resistance of each all-solid-state battery was compared and evaluated using the interfacial resistance of the all-solid-state battery according to No. 1 as a reference (1.0). The results are shown in Table 1 below.

TABLE 1

| | Composite particle | | | | |
| --- | --- | --- | --- | --- | --- |
| No. | Coating solution Molar ratio by ICP ($n_{Li}/n_P$) | Tg of coating film (° C.) | Particle surface composition ratio by XPS ($C_{Li}/C_P$) | Positive electrode Filling rate (%) | All-solid-state battery Resistance*[1] |
| 1 | 0.75 | 223 | 2.50 | 93 | 1.00 |
| 2 | 0.45 | 196 | 1.96 | 94 | 0.98 |
| 3 | 0 | 182 | 1.73 | 95 | 0.92 |
| 4 | 1.00 | 300 | 2.65 | 90 | 1.10 |
| 5 | 2.00 | 356 | 2.87 | 85 | 2.77 |
| 6 | — | — | — | 84 | 1.52 |

*[1] The value is a relative value with the initial resistance of No. 1 as 1.

Result

In Nos. 1 to 4 in which the Tg of the coating film is 300° C. or less, the interfacial resistance is remarkably reduced.

In No. 5 in which the Tg of the coating film exceeds 300° C., the interfacial resistance is remarkably increased. In No. 6 in which the coating film does not have the Tg, the interfacial resistance is increased.

The present embodiment and the present example are illustrative in all respects. The present embodiment and the present example are not restrictive. The technical scope of the present disclosure includes all changes within the meaning and range equivalent to the description of the claims. For example, from the beginning, it is planned to extract an appropriate configuration from the present embodiment and the present example and combine them as appropriate.

What is claimed is:

1. A method for preparing a positive electrode slurry, the method comprising:

producing a composite particle, the composite particle comprising a positive electrode active material particle and a coating film, wherein producing the composite particle comprises:

(a) preparing a mixture by mixing a coating solution and the positive electrode active material particle; and (b) producing the composite particle by drying the mixture by a spray drying method, wherein the coating solution contains a solute and a solvent, wherein the solute comprises a phosphorus compound comprising metaphosphoric acid, wherein:

the coating film covers at least a part of a surface of the positive electrode active material particle;

a glass-transition temperature of the coating film is 300° C. or less; and dispersing the composite particle and a sulfide solid electrolyte in a dispersion medium.

2. The method according to claim 1, wherein:

the coating solution satisfies a relationship of the following formula (1): $0 \leq n_{Li}/n_P \leq 1.1$; and in the above formula (1), $n_{Li}$ indicates molar concentration of lithium in the coating solution, and $n_P$ indicates molar concentration of phosphorus in the coating solution.

3. A method for producing a positive electrode, the method comprising:

(c) preparing a positive electrode slurry by the method according to claim 1;

(d) forming a positive electrode active material layer by applying the positive electrode slurry to a surface of a positive electrode current collector; and (e) producing the positive electrode by rolling the positive electrode active material layer and the positive electrode current collector at 170° C. or higher.

4. The method according to claim 3, wherein in (e), the positive electrode active material layer having a filling rate of 90% or more is obtained.

5. A method for producing an all-solid-state battery, the method comprising (f) producing the all-solid-state battery including the positive electrode produced by the method according to claim 3.

6. The method according to claim 1, wherein:

the solute further comprises a lithium compound; and the coating solution satisfies a relationship of the following formula (1): $0 < n_{Li}/n_P \leq 1.1$; wherein:

$n_{Li}$ indicates molar concentration of lithium in the coating solution; and $n_P$ indicates molar concentration of phosphorus in the coating solution.

7. The method of claim 6, wherein the lithium compound comprises at least one of lithium hydroxide, lithium carbonate, or lithium nitrate.

8. The method of claim 1, wherein the solute further comprises sodium.

9. The method of claim 1, wherein:

the positive electrode active material particle is a secondary particle comprising a plurality of primary particles; and the secondary particle has a D50 of 1 μm to 50 μm.

10. The method of claim 1, wherein drying the mixture by the spray drying method comprises:

forming droplets of the mixture by spraying the mixture from a nozzle, wherein a diameter of the nozzle is from 0.1 mm to 10 mm; and drying the droplets with air at a temperature from 100° C. to 200° C. to produce the composite particle.

11. The method of claim 10, wherein the mixture has a solid content of from 10% to 30% by volume.

12. The method of claim 10, further comprising subjecting the composite particle to a heat treatment comprising:

a heat treatment temperature of 150° C. to 300° C.; and a heat treatment duration of from 1 hour to 10 hours.

13. The method of claim 1, wherein:

the solute further comprises sodium and a lithium compound comprising at least one of lithium hydroxide, lithium carbonate, or lithium nitrate;

the coating solution satisfies a relationship of the following formula (1): $0 < n_{Li}/n_P \leq 1.1$; wherein:

$n_{Li}$ indicates molar concentration of lithium in the coating solution; and $n_P$ indicates molar concentration of phosphorus in the coating solution;

the mixture has a solid content of from 10% to 30% by volume;

drying the mixture by the spray drying method comprises:

forming droplets of the mixture by spraying the mixture from a nozzle, wherein a diameter of the nozzle is from 0.1 mm to 10 mm; and drying the droplets with air at a temperature from 100° C. to 200° C. to produce the composite particle; and the method further comprises subjecting the composite particle to a heat treatment comprising:

a heat treatment temperature of 150° C. to 300° C.; and a heat treatment duration of from 1 hour to 10 hours.

\* \* \* \* \*